(12) United States Patent
Miller

(10) Patent No.: US 11,174,133 B2
(45) Date of Patent: Nov. 16, 2021

(54) TRANSPORT APPARATUS FOR ASSEMBLY COMPONENT AND METHOD OF USING TRANSPORT APPARATUS

(71) Applicant: Miller Dowel Company, Wilmette, IL (US)

(72) Inventor: Michael R. Miller, Winnetka, IL (US)

(73) Assignee: MILLER DOWEL COMPANY, Wilmette, IL (US)

(*) Notice: Subject to any disclaimer, the term of this patent is extended or adjusted under 35 U.S.C. 154(b) by 68 days.

(21) Appl. No.: 16/858,033

(22) Filed: Apr. 24, 2020

(65) Prior Publication Data

US 2020/0346901 A1    Nov. 5, 2020

Related U.S. Application Data

(60) Provisional application No. 62/841,374, filed on May 1, 2019, provisional application No. 62/966,387, filed on Jan. 27, 2020.

(51) Int. Cl.
| | | |
|---|---|---|
| *B66C 1/66* | (2006.01) | |
| *B65G 7/12* | (2006.01) | |
| *E01C 11/14* | (2006.01) | |

(52) U.S. Cl.
CPC .................. *B66C 1/66* (2013.01); *B65G 7/12* (2013.01); *B65G 2813/026* (2013.01); *E01C 11/14* (2013.01)

(58) Field of Classification Search
CPC ....... B66C 1/66; B66C 1/42; B65G 2813/026; B65G 7/12; E01C 11/14; E04G 21/142

(Continued)

(56) References Cited

U.S. PATENT DOCUMENTS

| 100,055 A | 2/1870 | Montgomery |
| 332,308 A | 12/1885 | Valentine |

(Continued)

FOREIGN PATENT DOCUMENTS

| EP | 1 396 462 A2 | 3/2004 |
| WO | 93/02263 | 2/1993 |
| WO | WO 93/02263 | 2/1993 |

OTHER PUBLICATIONS

Search Report and Written Opinion of the International Searching Authority for corresponding PCT application PCT/US2020/037761 dated Aug. 20, 2020.

(Continued)

*Primary Examiner* — Paul T Chin
(74) *Attorney, Agent, or Firm* — Husch Blackwell LLP

(57) ABSTRACT

An apparatus for manipulating assembly components into desired configurations and a method for using same, where the assembly component includes a first and second bore set at a first and second transverse angles, for receiving attaching members. The apparatus includes a pair of attaching members that engage the bores to extend toward each other, and a manipulating member securing the base portions of the attaching members to each other. The attaching members may include side struts that relieve side pressure on the bores and may also include internal air passageways. The manipulating member has a length that prevents the secured attaching members from disengaging from their bores, and provides a location for a moving device to indirectly connect to the assembly component. The moving device can move the assembly component in a different directions to achieve different configurations.

20 Claims, 8 Drawing Sheets

(58) Field of Classification Search
USPC .............. 294/89, 215, 81.6, 82.1; 52/125.5; 411/400
See application file for complete search history.

(56) References Cited

U.S. PATENT DOCUMENTS

| | | | |
|---|---|---|---|
| 569,235 A | 10/1896 | Rockwell | |
| 876,985 A | 1/1908 | Malacon | |
| RE13,915 E | 5/1915 | Evans | |
| 1,224,426 A * | 5/1917 | Steele | E01B 9/06 |
| | | | 238/367 |
| 1,229,565 A | 6/1917 | Ahlgren | |
| 1,366,746 A * | 1/1921 | Pohl | B66C 1/66 |
| | | | 294/89 |
| 2,621,006 A | 7/1948 | Norrefeldt et al. | |
| 2,667,795 A | 2/1954 | Bowen | |
| 2,794,336 A * | 6/1957 | Ballou | E04G 21/142 |
| | | | 52/705 |
| 2,817,620 A | 12/1957 | Golick et al. | |
| 3,016,222 A | 1/1962 | Arthur | |
| 3,104,430 A | 9/1963 | Badali | |
| 3,153,283 A | 10/1964 | Weissman | |
| 3,204,583 A | 9/1965 | Nicholson | |
| 3,221,458 A | 12/1965 | Lucas | |
| 3,527,486 A | 9/1970 | Gamp | |
| 3,575,520 A | 4/1971 | Halpern | |
| 3,582,126 A | 6/1971 | Bladholm | |
| 3,635,573 A | 1/1972 | Halpern | |
| 3,756,635 A | 9/1973 | Beers | |
| 3,850,054 A | 11/1974 | Weissman | |
| 3,863,975 A * | 2/1975 | Oldenettel | B66C 1/666 |
| | | | 294/89 |
| 3,883,258 A | 5/1975 | Hewson | |
| 4,088,361 A * | 5/1978 | Ditcher | B66C 1/666 |
| | | | 294/82.1 |
| 4,093,389 A | 6/1978 | Wibrow | |
| 4,128,356 A | 12/1978 | Carlisle | |
| 4,137,115 A | 1/1979 | Lambert | |
| 4,250,681 A * | 2/1981 | Helderman | F16B 13/00 |
| | | | 405/259.1 |
| 4,340,327 A | 7/1982 | Martins | |
| 4,424,753 A | 1/1984 | Eatherton | |
| 4,518,291 A | 5/1985 | Lang et al. | |
| 4,536,044 A | 8/1985 | Ziegelheim et al. | |
| 4,639,197 A | 1/1987 | Tonare et al. | |
| 4,696,611 A * | 9/1987 | Guay | F16B 19/02 |
| | | | 411/103 |
| 4,793,745 A | 12/1988 | Ashbaugh et al. | |
| 4,815,902 A | 3/1989 | Durfee, Jr. | |
| 4,884,571 A | 12/1989 | Baker | |
| 5,100,162 A | 3/1992 | Lo | |
| 5,131,783 A | 7/1992 | Astl | |
| 5,232,302 A | 8/1993 | Wagner et al. | |
| 5,265,988 A | 11/1993 | Schmigalla et al. | |
| 5,326,196 A | 7/1994 | Noll | |
| 5,333,555 A | 8/1994 | McPhee | |
| 5,458,069 A | 10/1995 | Stolzman | |
| 5,529,424 A | 6/1996 | Neubert et al. | |
| D371,302 S | 7/1996 | Spirer | |
| 5,584,951 A | 12/1996 | Macfarland | |
| 5,673,629 A | 10/1997 | Ginnow | |
| 5,685,234 A | 11/1997 | Grigsby et al. | |
| 5,768,845 A | 6/1998 | Beaulieu et al. | |
| 5,771,650 A | 6/1998 | Williams et al. | |
| 5,807,015 A | 9/1998 | Goto | |
| 5,960,721 A | 10/1999 | Huettemann et al. | |
| 5,967,056 A | 10/1999 | Plante | |
| D426,766 S | 6/2000 | Burchall et al. | |
| 6,267,527 B1 | 7/2001 | Miller | |
| D456,700 S | 5/2002 | Miller et al. | |
| D484,781 S | 1/2004 | Miller | |
| 6,814,287 B1 | 11/2004 | Chang et al. | |
| 6,871,681 B2 | 3/2005 | Miller | |
| 7,856,933 B2 | 12/2010 | Miller et al. | |
| 10,005,586 B1 | 6/2018 | Miller | |
| 2002/0158478 A1* | 10/2002 | Harris | B66C 1/66 |
| | | | 294/81.6 |
| 2003/0089771 A1 | 5/2003 | Cybulski et al. | |
| 2004/0099339 A1 | 5/2004 | Miller | |
| 2006/0054064 A1 | 3/2006 | Miller et al. | |
| 2008/0115699 A1 | 5/2008 | Miller et al. | |
| 2008/0245030 A1 | 10/2008 | Sieber | |
| 2009/0255605 A1 | 10/2009 | Filion et al. | |
| 2010/0320787 A1* | 12/2010 | Dilsiz | B66C 1/422 |
| | | | 294/89 |
| 2013/0020819 A1 | 1/2013 | Alba | |
| 2020/0332817 A1 | 10/2020 | Miller | |
| 2020/0399892 A1* | 12/2020 | Miller | E04B 1/61 |

OTHER PUBLICATIONS

Search Report and Written Opinion of the International Searching Authority for corresponding PCT application PCT/US2020/029891 dated Jul. 9, 2020.
Udo Schmidt, Predicting Wood Movement, Woodcraft Magazine, Issue 13, pp. 76-76, 100206, https://www.woodcraft.com/media/W1siZilsljlwMTgvMTAvMjMvMTAvMDYvNDQvNDI5L1dvb2R TZW5zZTIucGRmIl1d/WoodSense2.pdf?sha=169d863a947fc7cb.
Nick Engler, Wood Movement, Workshop Companion, 2009, http://workshopcompanion.com/KnowHow/Design/Nature_of_Wood/2_Wood_Movement/2_Wood-Movement.htm.
Jeff Lefkowitz, Grain Orientation and Wood Movement, Part 1: Chairmaking Techniques, 101112, http://www.jefflefkowitzchairmaker.com/chairmakers-journal/grain-orientation-and-wood-movement-part-1.
PCT International Search Report, dated Jul. 9, 2020, corresponding to International Application No. PCT/US2020/029891.
Written Opinion of the International Searching Authority, dated Jul. 9, 2020, corresponding to International Application No. PCT/US2020/029891.
English language translation of bibliographic data and abstract of EP1396462 (A2).
English language translation of specification of EP1396462 A2—(FIRMA) translation.

* cited by examiner

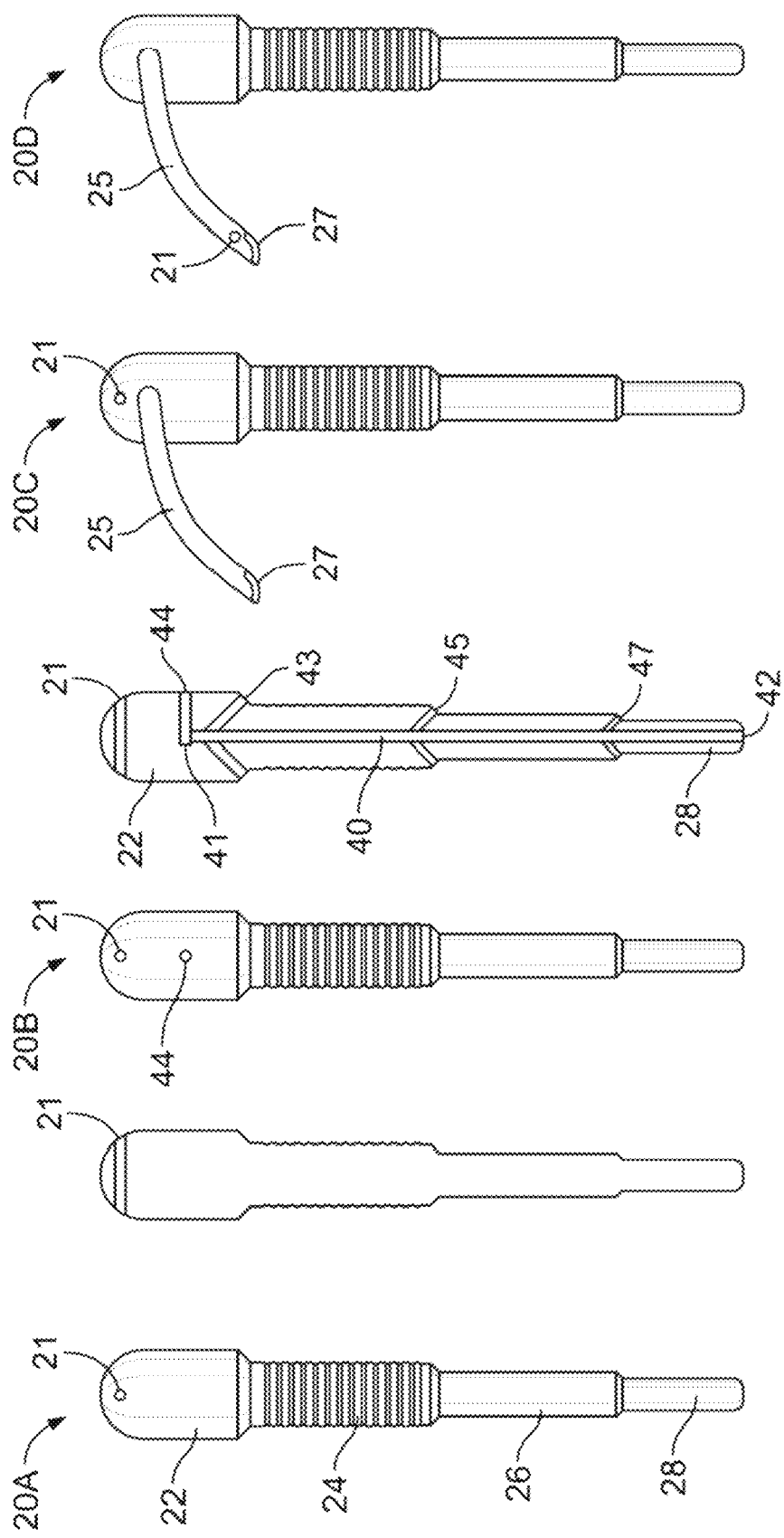

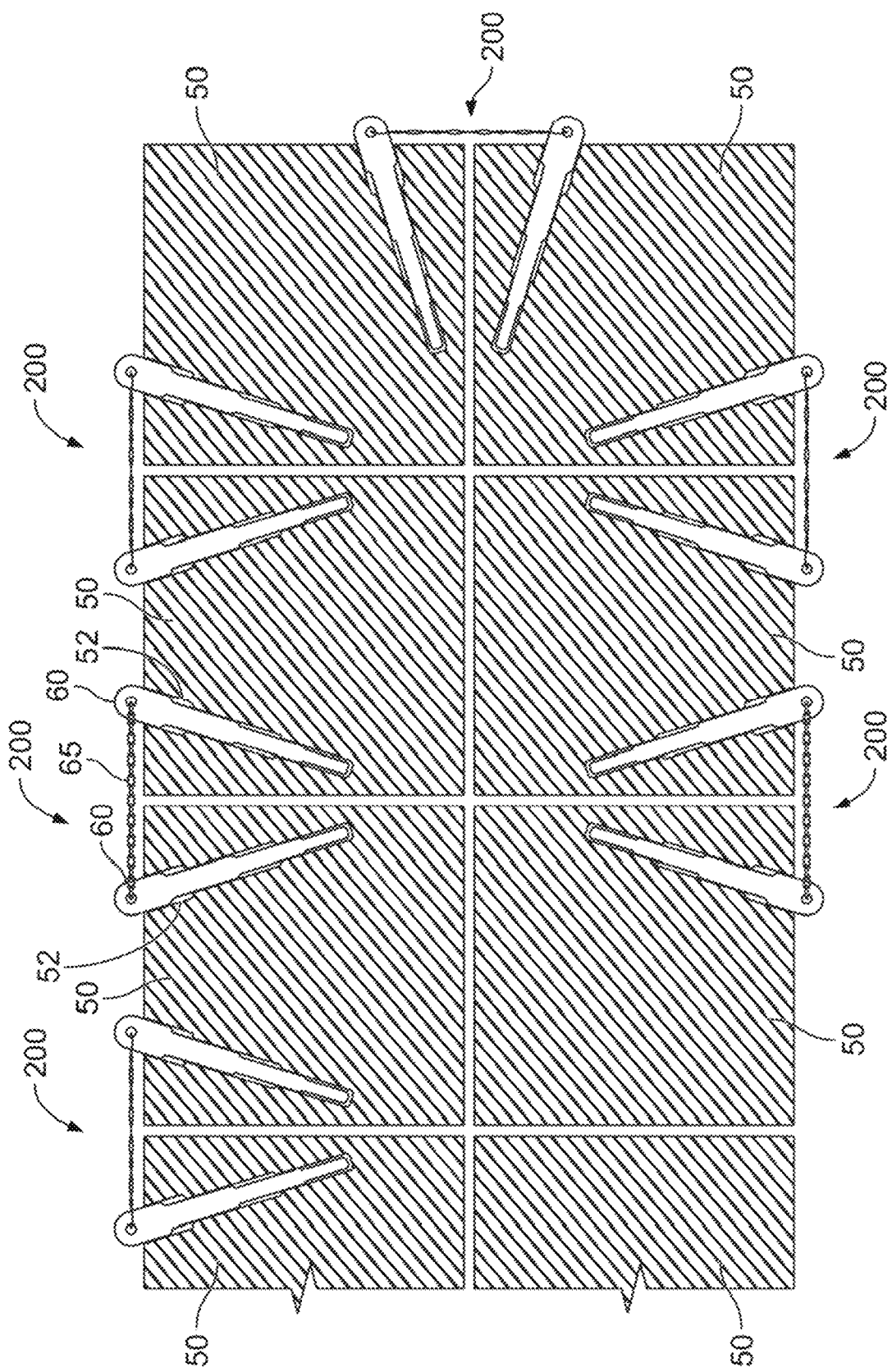

TRANSPORT APPARATUS FOR ASSEMBLY COMPONENT AND METHOD OF USING TRANSPORT APPARATUS

CROSS-REFERENCE TO RELATED APPLICATION

This application claims the benefit of the filing date of U.S. Provisional Application Ser. No. 62/841,374 filed May 1, 2019, entitled, "Transport Apparatus For Assembly Component And Method Of Using Transport Apparatus" which is hereby incorporated by reference as if fully set forth herein. This application further claims the benefit of the filing date of U.S. Provisional Application Ser. No. 62/966,387 filed Jan. 27, 2020, entitled, "Transport Apparatus with Side Strut for Assembly Components and Method of Using Transport Apparatus".

BACKGROUND OF THE INVENTION

While assembling a multi-component assembly, individual components must be maneuvered into desired positions with respect to other components, especially when the assembly is in a partially-assembled state. Similarly, large quantities of such components must be transported from one location to another, such as transferring a manufactured item from a manufacturing facility to a storage container, or from a transport vehicle to a construction site.

Some large or weighty components can be difficult to transport or manipulate. There is a need for a device or apparatus for moving such components to a desired location and for manipulating those components into temporary positions or permanent configurations during the construction of large-component assemblies, or for the removal of those components during deconstruction of an assembly. There is a particular need for such a transport apparatus when the large components are too large or too heavy for an individual person to readily manipulate, and when those large components, whether by design or by accident, lack a structure for manipulating them.

There is also a need for an apparatus that can be used to transiently handle the position of large components that can be used in concert with other devices that have the power or size to accomplish the handling of the large components. There is a need for a transport apparatus that can form a temporary engagement with the large assembly components, accomplish the manipulation of the components, and then be easily disengaged from the assembly components without damaging or altering the components.

There is a need for such a transport apparatus of modest size, making it portable and usable in limited spaces, having a structure that enables it to bear the weight of assembly components having a much greater comparative size or weight, especially in the absence of supplemental support devices such as straps. Thus, such a transport apparatus could temporarily accommodate the manipulation of assembly components having a much greater comparative size or weight. There is also a need for a transport apparatus that is made of a minimal number of components, that can be quickly and readily assembled and disassembled, that can accomplish the movement the assembly components quickly and readily, and then be disassembled and reused to transport additional assembly components.

There is a need for such a transport apparatus that can be adjusted to accommodate the transport of components or different sizes.

There is a need for a method of using common construction components or elements to affect the movement of the assembly components, combining them is such a way as to create a transport apparatus for moving large assembly components into desired configurations, and then disassembling the elements of the transport apparatus, leaving the assembly component in place.

As an example, certain wall systems are composed of multiple wall panels and beams. Individual panels or beams can have a size or weight too great for a single man to manipulate alone (or with others). Such wall panels can include depressions or bores in their tops, bottoms, or sides, the bores capable of being engaged by a transport apparatus and moved from one position or location to another.

As another example, construction assemblies are assembled out of one or more construction components, each of which can have a size and shape requiring a heavy-lifting device for its transport.

BRIEF SUMMARY OF THE INVENTION

This disclosure generally relates to an apparatus for manipulating assembly components into desired configurations, leaving the assembly components structurally unchanged. The disclosure also relates to a method of assembling a transport apparatus that is made from a minimum number of elements, readily transports the assembly components, and can be quickly disassembled to leave the assembly components in the desired configuration.

BRIEF DESCRIPTION OF THE DRAWINGS

FIG. 3A illustrates a side view of a dowel according to an embodiment.

FIG. 3B illustrates a cross-sectional view of the dowel of FIG. 3A.

FIG. 3C illustrates a side view of a dowel with air passages according to an embodiment.

FIG. 3D illustrates a cross-sectional view of the dowel with air passages of FIG. 3C.

FIG. 3E illustrates a side view of an attaching dowel with a side strut according to an embodiment.

FIG. 3F illustrates a side view of an attaching dowel with a side strut according to another embodiment.

FIG. 11 illustrates a cross-sectional view of a transport apparatus according to another embodiment, where a plurality of transport apparatuses are used to secure a plurality of protective mats.

Figure 1A:
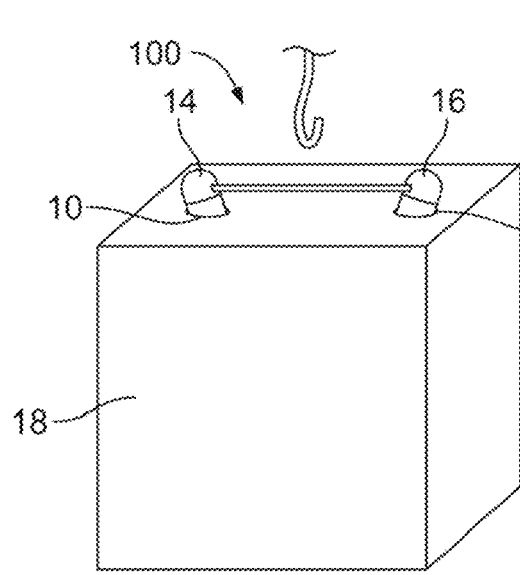
FIG. 1A illustrates a perspective view of an embodiment of a transport apparatus providing an indirect connection between a lifting or moving device and an assembly component, the transport apparatus including a pair of angled dowels and a manipulating member; in this figure, the lifting device is about to engage a central portion of the manipulating member.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

As shown in FIGS. 1-11, the embodiments of this disclosure include an apparatus for indirectly connecting an assembly component to a lifting or moving device, so that the device can move the assembly component to a desired location or configuration.

The apparatus is meant to accommodate assembly components having certain features; in particular having two or more depressions or bores on at least one of its sides or exterior surfaces. The assembly component can have a top surface, opposed bottom surface, with a central portion between the top and bottom surfaces.

As an example, certain wall systems are composed of multiple wall panels and/or beams. Individual components can have a size or weight too great for a single person to manipulate alone (or with others). Such components can include depressions or bores in their tops, bottoms, or sides, the bores capable of being engaged by a plurality of attaching members that can be secured with respect to the component, and secured to each other by way of a manipulating member. The manipulating member can provide a structure by which another device indirectly connects to the component, for moving and manipulating the component from one location, position, or configuration, to another.

When manipulation of the construction component is complete, the manipulating member can be disengaged from the attaching members. The disengaged attaching members, now lacking a connection to each other, can be readily removed from the assembly component. Thus, the construction component is delivered to a desired configuration while being left structurally unchanged.

Embodiment: Transport Apparatus

Generally, a transport apparatus can include two or more attaching members for connecting the transport apparatus to the assembly component to be handled. The attaching members can be connected to a manipulating member that: secures the attaching members to the assembly component and to each other; and restricts the attaching members to a limited range of movement, relative to the assembly component; and provides a structure for the engagement of a device that can lift or move or transport the assembly component such as wall panel, beam, etc.

For example, a wall panel assembly can include a series of wall panels arranged beside each other in a row, with a longitudinally extending horizontal top member and a corresponding bottom member affixing the top and bottom ends of the wall panels in place between them. Each wall panel can have a vertical length that is substantially greater than its horizontal height, defining an elongated member or element. The sides of adjacent wall panels can communicate with each other, and the first surfaces of the wall panels can, when assembled together, define an outward-facing surface of the assembly.

The wall panels are individual components of the wall panel assembly that must be manipulated into specific configurations in order to construct the wall panel assembly; however, individual wall panels typically lack a structure that allows individuals to easily change the location, orientation, or position of the wall panels.

Each wall panel or elongated member such as a beam includes a top end and an opposed bottom end, and has generally planar opposed first and second surfaces extending between the top and bottom ends, and first and second opposed side portions.

To assemble a transport apparatus that is attached to the wall panel and capable of transporting it from one position to another, one or more pairs of attaching members can engage the wall panel bores.

Figure 1B:
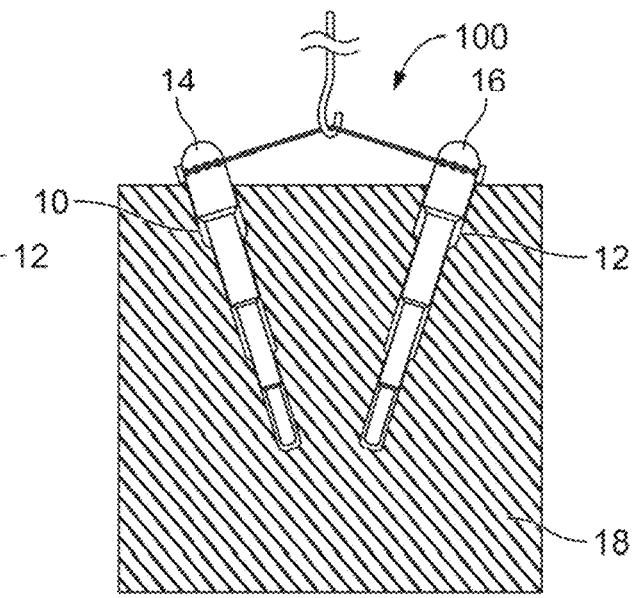
FIG. 1B illustrates a cross-sectional view of a transport apparatus engaging as assembly component according to an embodiment. A moving device is engaging the transport apparatus, for transporting the assembly component into a new position, location, or configuration.

Referring generally to FIGS. 1A and 1B, at least one exterior surface of the wall panel or elongated member 18, preferably its top end, can include a plurality of bores or depressions 10, 12. Each bore 10, 12 can include an aperture on the surface of the wall panel 18, the aperture communicating with a passageway that extends inward from the surface into an interior portion of the wall panel 18. Preferably, the passageway terminates within the wall panel 18.

Each bore 10, 12 is configured to accept an attaching member 14, 16. According to an embodiment, the attaching members 14, 16 can be stepped dowels as shown in FIGS. 3A and 3B. In another embodiment, the attaching members 14, 16 can be dowels with air passageways as shown in FIGS. 3C and 3D. In yet another embodiment, the attaching members 14, 16 can be dowels with struts as shown in FIGS. 3E and 3F. Other attaching members may also be used, some of which are described in U.S. Pat. Nos. 7,856,933, 10,005, 586, and U.S. patent application Ser. No. 16/842,450, all of which are incorporated herein by reference.

To accommodate attaching members 14, 16, the corresponding bore 10, 12, which can be predrilled, can be set into the wall panel 18, the bores 10, 12 defining pathways that run in transverse directions to the first and second surfaces of the wall panel 18. That is, the bores 10, 12 preferably define pathways that are not perpendicular to the surface of the wall panel 18, are not set at right angles with respect to the surface of the wall panel 18, and do not define pathways that are parallel to a longitudinal axis of the wall panel 18.

The attaching members 14, 16 can fit snugly into the cavity defined by the bores 10, 12 as shown in FIG. 1B. The attaching members 14, 16 and the bores 10, 12 can form a friction fit. When stepped dowels are used as attaching members, because of their stepped shapes, the attaching members 14, 16 can be partially inserted into the bores 10, 12 with minimal force.

Figure 1C:
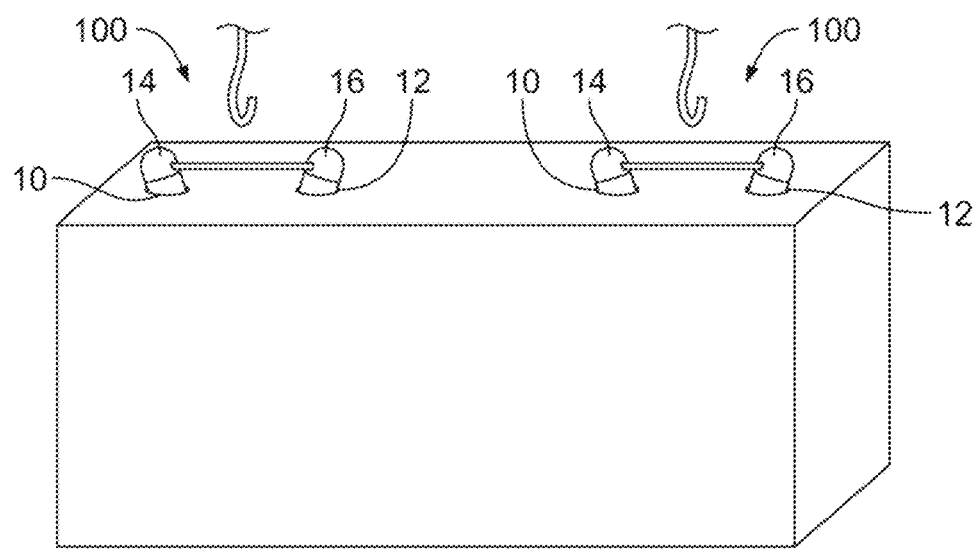
FIG. 1C illustrates a perspective view of another embodiment of the transport apparatus according to an embodiment, where a plurality of transport apparatuses are used to move an assembly component.

Depending on the size and weight of the assembly component being moved, in some embodiments, as shown in FIG. 1C, a plurality of transport apparatuses 100 can be used to move said assembly component.

One or more pairs of attaching members 14, 16 can be inserted into a corresponding pair of bores 10, 12. Just as the paired bores 10, 12 define pathways extending from the top surface of the wall panel 18 inward toward a central portion of the interior of the wall panel 18, when the attaching members 14, 16 are engaged within the bores 10, 12, the attaching members 14, 16 will be set in pathways extending from the top surface of the wall panel 18 inward toward a central portion of the interior of the wall panel 18.

When viewed in cross-section, in a plane parallel to the planar surfaces of the wall panel 18, the bores 10, 12 and the attaching members 14, 16 define pathways that, when extended, converge to define a triangular section of the wall panel 18 as shown in FIG. 1B; in some embodiments, the triangular section has a midline or central axis travelling along a portion of a central longitudinal axis of the wall panel 18.

Each attaching member 14, 16 can be inserted into a corresponding bore 10, 12 so that a portion of the attaching member 14, 16 protrudes from the bore 10, 12, extending upward and outward from the top surface of the wall panel.

Optionally, adhesive can be applied to the dowel or the bore to facilitate a seal between the components.

Figure 2A:
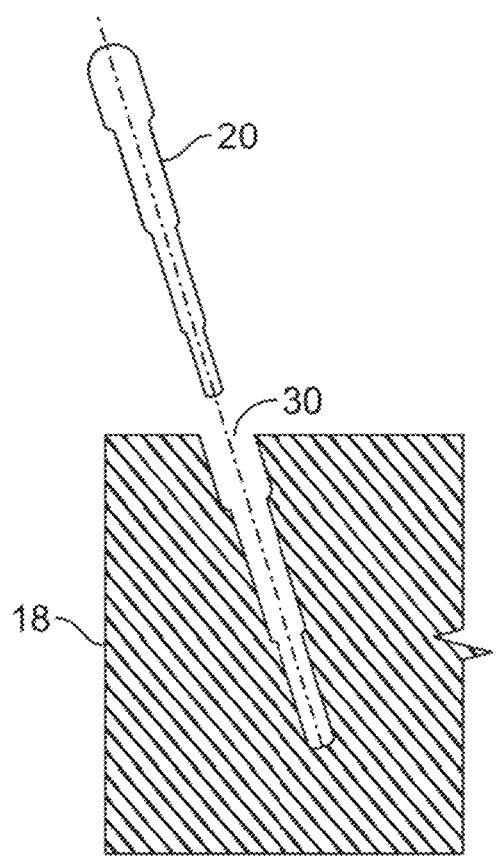
FIG. 2A illustrates a cross-sectional view of one embodiment of a transport apparatus beginning to engage an assembly component according to an embodiment.
Figure 2B:
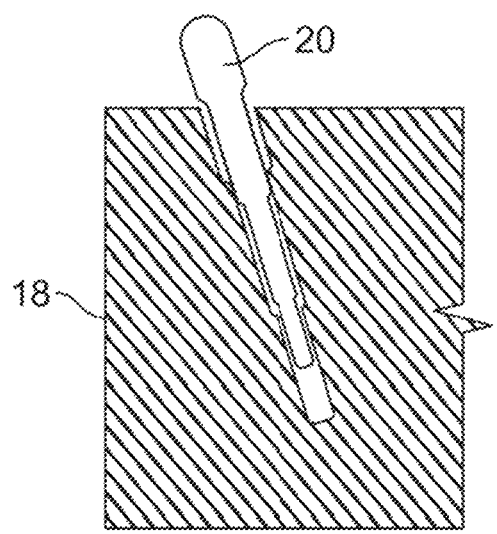
FIG. 2B illustrates a cross-sectional view of the embodiment of FIG. 2A in an engaged configuration.

Referring briefly to FIGS. 2A and 2B, in some embodiments where a stepped dowel 20 is used as an attaching member, the corresponding bore 30 can include a cavity made of sections, such that the section closest to the wall panel surface, defines a cavity having the largest circumference or perimeter and each successive section defining a cavity with a smaller circumference or perimeter than the preceding section as shown. The negative space defined by the bore 30 can have a stepped or terraced shape or profile of a size and shape to accept a stepped dowel 20.

Returning to FIGS. 1A-1C, the bores 10, 12 are arranged in the wall panel 18 at a non-perpendicular angle, at a transverse or acute angle, relative to the surface of the top end of the wall panel 18. Pairs of bores 10, 12 can be set in the top end so that the bores 10, 12 defines lines or paths that extend toward each other as shown in FIG. 1C. Each of the bores 10, 12 in pairs of bores 10, 12 can extend toward a longitudinal axis of the wall panel 18, or toward a longitudinal axis set between the bores 10, 12. The pairs of bores 10, 12 can define angles with respect to the top end surface that are between 0-90°. In an embodiment, the acute angles are between 30-60°. In another embodiment, the acute angles are between 40-50°.

In an embodiment, the paired bores 10, 12 define pathways that are mirror images of each other, set on either side of a central longitudinal axis of the assembly component such as a wall panel 18. The paired bores 10, 12 can be spaced apart from each, far enough apart that their pathways do not overlap or intersect in the interior section of the wall panel 18. Each wall panel 18 can have one or more sets of paired attaching members 14, 16 on an outer surface or exterior side of the wall panel 18.

FIGS. 3A-3F illustrate various embodiments of dowels 20A-20D that may be used as attaching members 14, 16 as previously described. These dowels can be made of a variety of materials, including wood, plastic, and metals or metal alloys, including steel, or any other material typically used to make a dowel.

Referring first to FIGS. 3A and 3B, a stepped dowel 20A according to an embodiment can be made of multiple sections, the first section 22 having the largest circumference or perimeter and each successive section 24, 26, 28 having a smaller circumference or perimeter than the preceding section. When viewed in profile, such a dowel has a shape that is stepped or terraced, having a base portion 22 that is wider or larger than its opposed tip portion 28.

Where a stepped dowel 20 has a base portion 22 encompassing the dowel's first section 22, and successive sections ending in a last section 28 has forms part of the dowel's tip portion 28, which is smaller or narrower in cross-section than the base portion 22, the tip portion 28 is inserted into the interior portion of the wall panel 18, while the base portion 22 can protrude out of the bore 10, 12.

In some embodiments, as shown in FIGS. 3C and 3D, each stepped dowel 20B can include an internal passageway 40 between the base portion 22 and the tip portion 28, to allow air to travel between the top and bottom ends of the stepped dowel 20B. When a stepped dowel 20B engages a bore, an air-tight or liquid-tight seal can form between the stepped dowel and 20B the bore. Such an internal passageway 40 can provide a means to conduct air to the tip portion 28 of the engaged stepped dowel 20B, to interrupt such a seal near the tip portion 28.

The internal passageway 40 can extend from a first aperture 42 in the tip portion 28 to a second aperture 44 in the base portion 22 of the stepped dowel 20B; it can form a straight, direct linear path, or an indirect route in the interior portion of the dowel 20B. Multiple internal passageways can extend between the base portion 22, particularly in the part of the base portion expected to protrude from the bore, to the tip portion 28 or to other parts of the dowel 20B that is expected to be engaged with the interior portion of the wall panel 18 as shown in FIG. 2B. The internal passageway 40 may include, for example, side passages 41, 43, 45, 47 to each successive section 22, 24, 26, 28 as shown in FIG. 3D. The internal passageway 40 may be configured to allow air in when open without substantially reducing the structural integrity of the dowel 20B. Such internal passageway 40 can have a mean to close or obstruct the internal passageway 40, such as a plug or lid or seal or the like, until airflow within the engaged stepped dowel 20B is desired.

Alternatively, such an internal passageway 40 can engage another tool to facilitate removal of the dowel 20B from the bore, such as a handle portion.

Each dowel 20B can include one or more central and side passageways so long as air can be vented without significantly weakening the structural integrity of the dowel 20B. For example, each side passages 41, 43, 45, 47 may be vented to their own corresponding apertures in the base portion 22, or they may be connected to a central passageway and vented through a same aperture, or any combination thereof.

Figure 4:
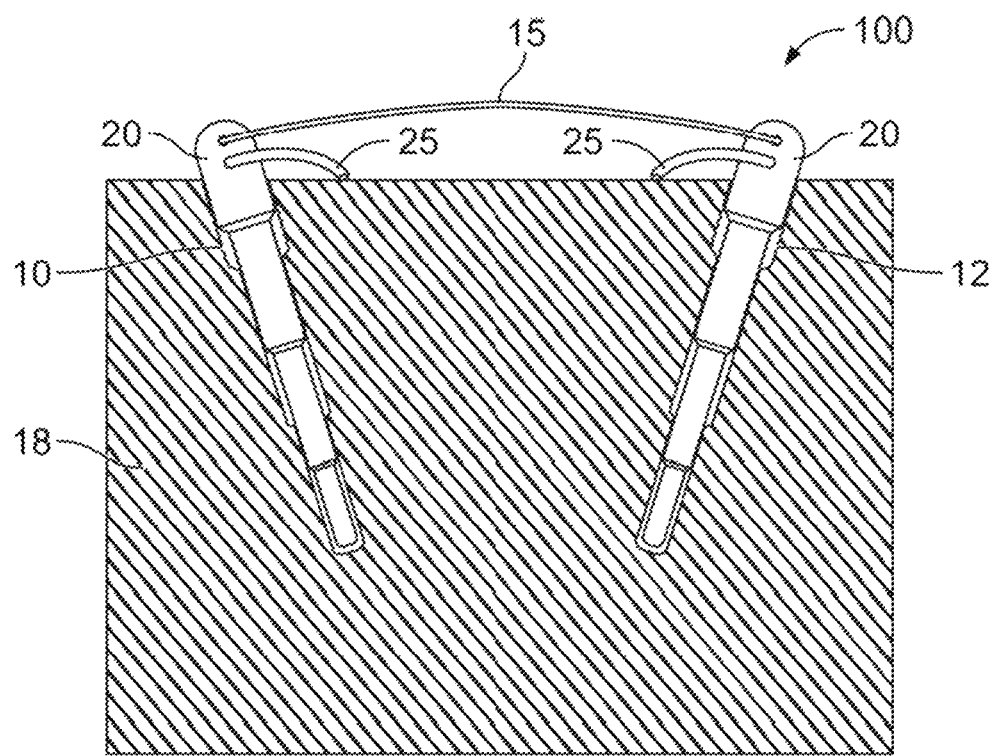
FIG. 4 illustrates a cross-sectional view of a transport apparatus according to an embodiment, where dowels with side struts are used.
Figure 5A:
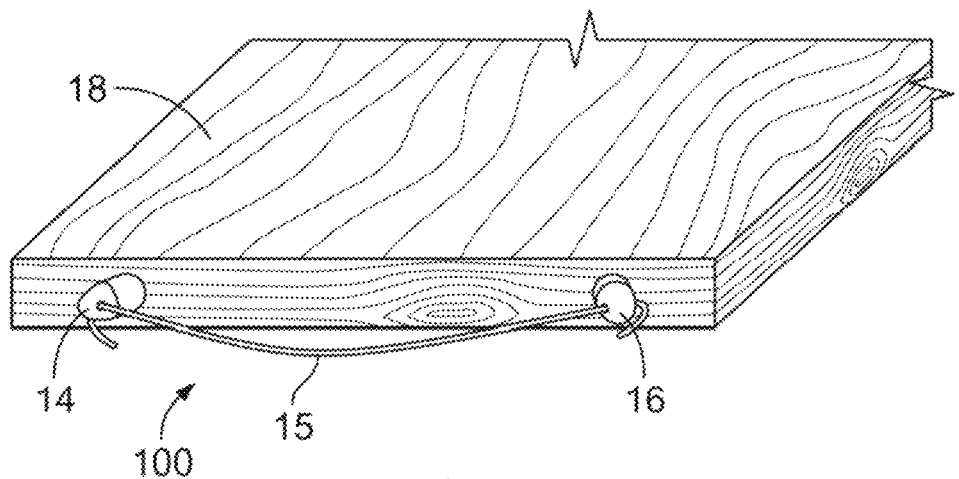
FIGS. 5A-5B illustrate perspective views of a transport apparatus according to an embodiment.
Figure 5B:
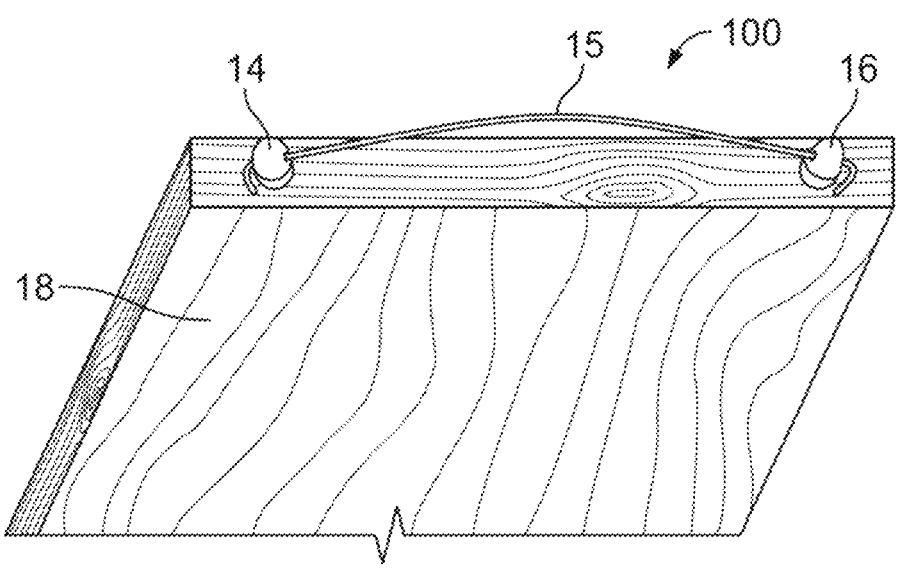

In yet another embodiment, as shown in FIGS. 3E and 3F, a side strut 25 may be provided on a dowel 20D, where the side strut 25 extends from the base portion 22 transversely to the longitudinal axis of the dowel 20D. The strut 25 relieves pressure on the edges of the bore that the dowel 20D is engaged in, thereby keeping the wall panel 18, or other assembly component, smooth at the edge of the bore. The strut 25 may be integral to the dowels 20D or attached in any suitable manner and may be made of any load bearing material such as wood, plastic, and metal or metal alloys, and any other suitable material. A padding 27 may be provided on a distal end of the strut 25 to protect the surface of the assembly component from being damaged.

Where dowels with struts are used as attaching members, the dowels 20 can be inserted into the bores 10, 12 so that the struts 25 are parallel to the top surface of the assembly component, such as the wall panel 18, as shown in FIG. 4. The struts 25 are positional on the dowels 20 so that when fully inserted in the bore 10, 12 the struts 25 rest on the surface of the wall panel 18. Thus, when fully inserted, the struts 25 are in contact with the surface of the wall panel 18. As a manipulating member 15 puts load on the dowels 20 tending to pull them against the top edges of the bores 10, 12, the struts 25 push against the surface of the wall panel 18 relieving pressure on the edge of the bores 10, 12.

Each attaching member can include structure or element for connecting or joining to a manipulating member 15. In one embodiment, when an attaching member is a dowel 20, the base portion 22 of the dowel 20 can include a securing passageway running 21 in a linear or straight path that is transverse to a central longitudinal axis of the dowel 20, providing a securing passageway 21 that extends through the base portion 22 with an aperture on either end as shown in FIGS. 3A-3E. When the dowel 20 is engaged to the bore, the securing passageway 21 can define a pathway that is substantially parallel to the top surface of the wall panel 18. In another embodiment, as shown in FIG. 3F, when a strut 25 is provided, the securing passageway 21 may be provided at the strut 25 instead or in addition to the base portion 22 of a dowel 20.

Referring generally to FIGS. 5A-8, where the attaching members 14, 16 attach the transport apparatus 100 to the assembly component, such as the wall panel 18, the manipulating member 15 provides a structure by which some lifting device can lift or move the wall panel 18. The manipulating member 15 also provides a component that restricts the movement of the pair of attaching members 14, 16 after the pair of attaching members 14, 16 are engaged to a corresponding pair of bores.

The manipulating member 15 is a component that spans between the pair of attaching members 14, 16. The manipulating member 15 can include a rigid or flexible element. The manipulating member 15 can include a flexible element like a chain, wire, plastic line, tubing, rope, or cord, or the like. A manipulating member 15 can include a solid element like a like a rod, pole, tube, bar, or the like, although such solid element can be rigid or flexible in its pliability. The manipulating member 15 can comprise both solid and flexible elements, such a length of chain connected on each end to a pair of hooks, or a rod having cords attached to either end. The manipulating member 15 has a central portion that has a length that is great enough to span the distance between the pair of attaching members 14, 16.

In some embodiments, the manipulating member 15, especially its central portion, can be made of materials capable for bearing heavy loads. It can be made of a variety of materials, including wood, plastic, and metals or metal alloys, including steel, or any other material typically used to bear loads.

On either side of the central portion, the manipulating member 15 can include a first portion for connecting with one of the paired attaching members 14, 16, and a second portion for connecting with the other of the paired attaching members 14, 16. The attaching members 14, 16 can include a structure or means for securing the attaching members 14, 16 to the manipulating member 15 as previously described.

When dowels 20 with securing passageways 21 are used as attaching members 14, 16, the paired dowels 20 can be aligned so that their securing passageways 21 can define a pathway running along a common straight line or linear path. When the paired dowels 20 engage the paired bores, it is preferred that one of the apertures of the securing passageway 21 of one of the dowels 20 be positioned to face one of the apertures of the securing passageway 21 of the other of the dowels 20. In such embodiments, the manipulating member 15 can engage the facing apertures of the paired dowels 20. In some embodiments, the manipulating member 15 can be inserted through the securing passageway 21 of each paired dowel 20, for securing first and second portions of the manipulating member 15 to one or the other of the paired dowels 20.

Optionally, an additional element or component can be used to secure the first and second portions of the manipulating member 15 to each of the paired dowels 20, such as a clip, tie, hook, clamp, or other commonly used fastener.

An example of a manipulating member 15 is a length of chain having a hook on either end. Another example is a rod threaded through the securing passageways 21 of the dowels 20 and secured on each end with a bolt or pin or the like. Another example includes a cord threaded through the facing apertures of the securing passageways 21 and knotted on the outward-facing apertures of the securing pathways 21, with knots large or tight enough to prevent the cord from escaping the securing passageways 21.

When the transport apparatus 100 is engaged, the central portion of the manipulating member 15 has a length that restricts the range of movement for the paired attaching members 14, 16 attached to the manipulating member as shown in FIGS. 5A-8. The central portion can have such a length before it is connected to the paired attaching members 14, 16, or the length of central portion can be adjusted to an appropriate length after its attachment to one or both of the paired attaching members 14, 16.

After the attaching members 14, 16 are attached to the bores, and the manipulating member 15 is secured to the attaching members 14, 16, the length of the central portion of the manipulating member 15 can affect the operation of the transport apparatus 100. When lifting or pulling force is exerted on the central portion of the manipulating member 15, each paired attaching member 14, 16 exerts an outward force toward one end of the central portion. In tandem, the paired attaching member 14, 16 exerts force against opposite ends of the manipulating member 15, forcing those opposite ends in opposite directions. Thus, the paired attaching members 14, 16, which extend away from each other force the first and second portions of the manipulating member 15 away from each other.

The central portion of the manipulating member 15 has sufficient length to connect the attaching members 14, 16. If the central portion of the manipulating member 15 has a length that is too long (for the purposes of transporting the assembly component), such lifting or pulling force can pull the engaged attaching members 14, 16 from their corresponding bores. If the central portion of the manipulating member 15 has a length that is shorter (but at least long enough to connect the attaching members 14, 16), then the engaged attaching members 14, 16 have insufficient space to fully disengage from their bores. That is, the engaged attaching members 14, 16 will be secured into place; it might have enough slack to move partway out of the bore but will have insufficient slack to allow it to fully exit the bore.

If the central portion of the manipulating member 15 is short enough, these opposing forces can create tension in the central portion of the manipulating member 15, as the attaching members 14, 16 force each end of the central portion away from the opposite end. Each of the paired attaching members 14, 16 simultaneously provides tension on the central portion of the manipulating member 15 in opposing directions, preventing its partner attaching member 14, 16 from getting enough slack to exit its bore.

If the paired attaching members 14, 16 were positioned perpendicular to the top surface of the wall panel 18, then exerting force against the attached manipulating member 15 could result in pulling the engaged attaching members 14, 16 from the bores. If the paired attaching members 14, 16 were positioned to toward each other (or toward the central longitudinal axis of the wall panel 18), then again, exerting force against the attached manipulating member 15 could result in pulling the engaged attaching members 14, 16 from the bores.

But because the paired attaching members 14, 16 are oriented to extend away each other, exerting force against the attached manipulating member 15 directs the paired attaching members 14, 16 to move away from each other. Because the attaching members 14, 16 are connected to each other via the manipulating member 15, the attaching members 14, 16 can move only as far as the length of the central portion of the manipulating member 15 allows; if that length is short enough, then the attaching members 14, 16 have insufficient space to exit their bores.

When the transport apparatus 100 is secured to the wall panel 18, a lifting device can be attached or engaged to the central portion of the manipulating member 15; that lifting device can then lift the wall panel 18 along a horizontal or vertical direction, and move the wall panel 18 from a first position to a second position, from a first location to a second location, or from a first configuration to a second configuration. In some embodiments, the manipulating member 15 is rotatably connected to the attaching members 14, 16, allowing the manipulating member 15 to move in a rotating or axial fashion with respect to the attaching members 14, 16. In such embodiments, the transport apparatus 100 can achieve rotational movement of the wall panel 18, in addition to moving the wall panel 18 in horizontal and vertical directions.

Figure 7:
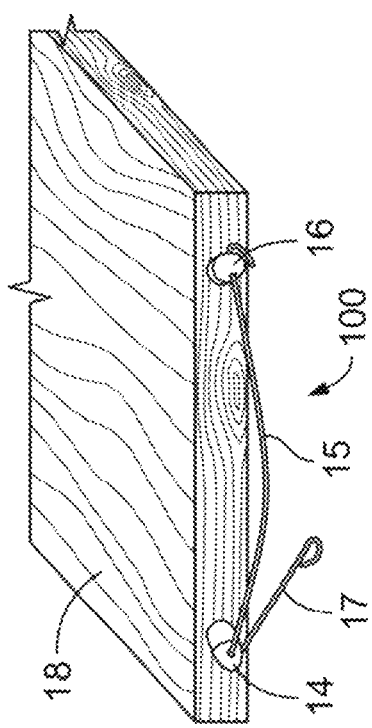
FIGS. 7-8 illustrate perspective views of a transport apparatus according to another embodiment.
Figure 8:
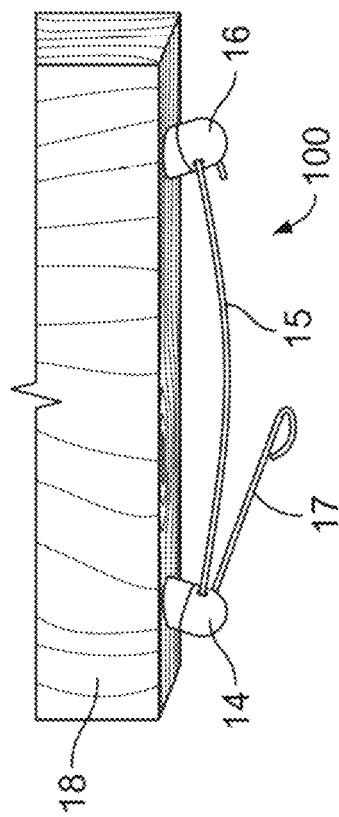
Figure 6:
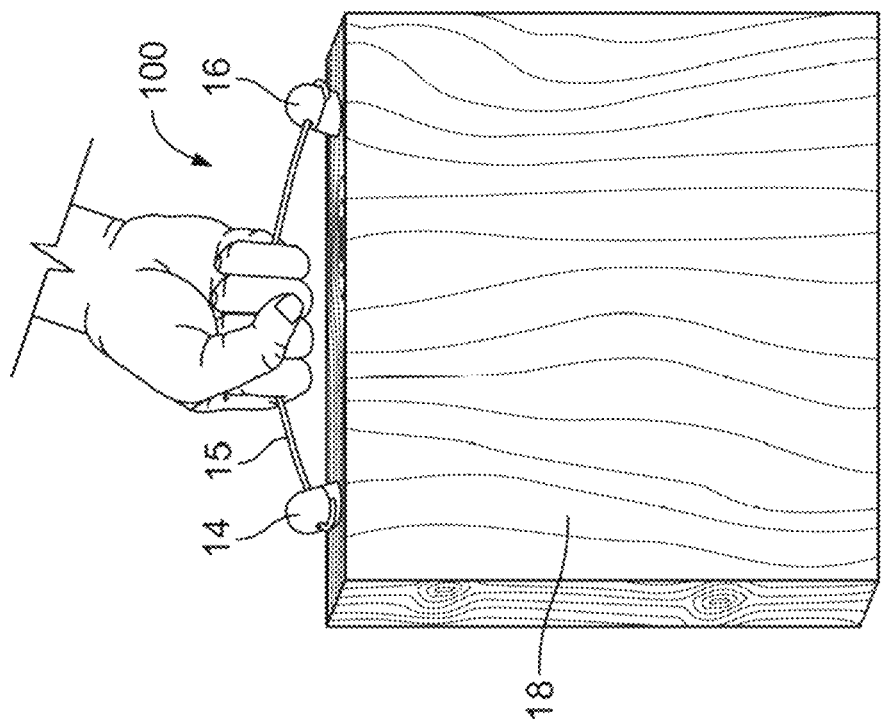
FIG. 6 illustrates a perspective view of the transport apparatus of FIGS. 5A-B being used to move an assembly component, the lifting or moving device being a human hand.

A variety of lifting or moving devices can be used to lift or move the wall panel 18, such as cranes, hoists, fork lifts, pulleys, winches, and the like. In certain systems, hands and certain handheld devices can be used as a lifting device as shown in FIG. 6. In some embodiments, as shown in FIGS. 7 and 8, in lieu of lifting the manipulating member 15 via its central portion, one or both end portions can include a handle member 17 to allow an individual or a moving device to engage for transporting the assembly component.

Figure 9:
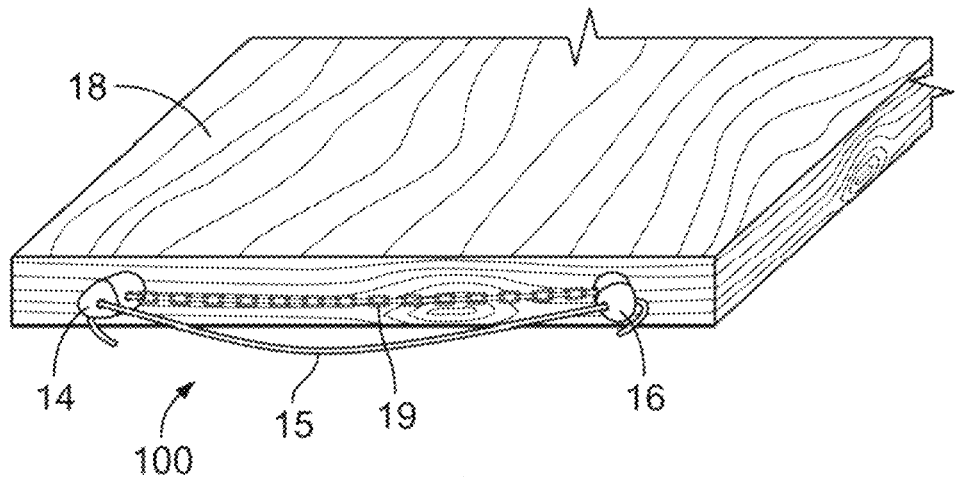
FIGS. 9-10 illustrate perspective views of a transport apparatus according to yet another embodiment.
Figure 10:
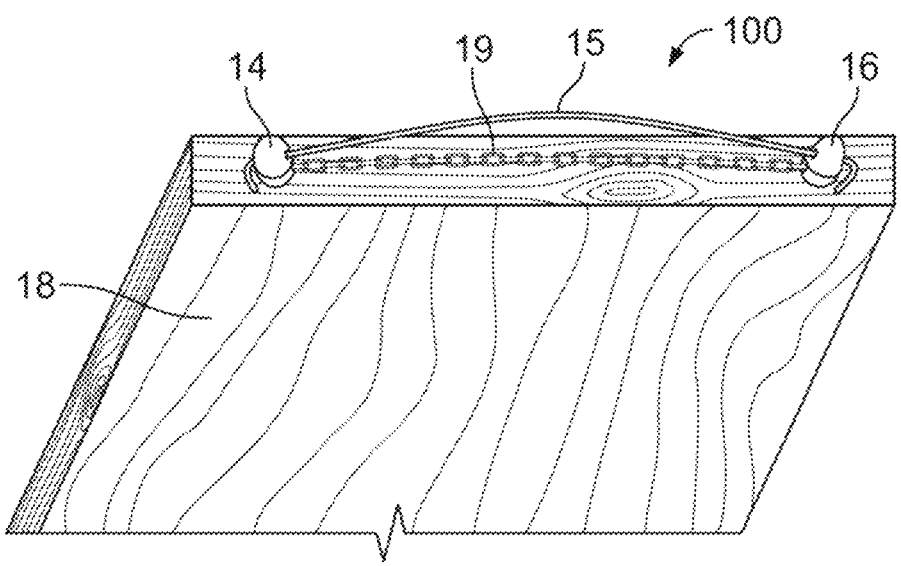

In some embodiments, a connecting member 19 may be provided at the base portion of the attaching members 14, 16 as shown in FIGS. 9 and 10. The connecting member 19 may be a portion of the manipulating member 15, or that it can be an element separate from the manipulating member 15.

The connecting member 19 can include a flexible element like a chain, wire, plastic line, tubing, rope, or cord, or the like. The connecting member 19 can include a solid element like a like a rod, pole, tube, bar, or the like, although such solid element can be rigid or flexible in its pliability. The connecting member 19 can comprise both solid and flexible elements, such a length of chain connected on each end to a pair of hooks, or a rod having cords attached to either end. In some embodiments, each attaching member 14, 16 may have its own connecting member 19, where the connecting member 19 of the paired attaching members 14, 16 are joined together by a fastener, such as a clip, tie, hook, clamp, or other commonly used fastener. In embodiments where dowels with struts are utilized as attaching members 14, 16, the connecting member 19 may be provided at the struts, connecting the paired dowels together.

In addition to connecting the attaching members 14, 16 together, the connecting member 19 may be used in some embodiments as an aid to dislodge the attaching members 14, 16 from the bores. For example, in embodiments where each attaching member 14, 16 has its own connecting member 19, after disengaging the manipulating member 15 from the attaching members 14, 16, the fastener linking the connecting member 19 of each attaching member 14, 16 may be disengaged, and each connecting member 19 may be connected to a lifting device to lift or otherwise remove the respective attaching member 14, 16 from its bore.

Although the embodiment described above is for wall panels and wall systems, the transport apparatus described therein can be applied to other components of other assembly systems, provided the component has an exterior surface and a plurality of dowel-receiving cavities for engaging stepped dowels. For example, the transport apparatus can be used to transport construction panels, beams, or other assembly components in need of transport. Further, although the embodiment described herein generally described using stepped dowels as attaching members, other devices can also be used, such as fasteners, rods, screws, or other devices capable of being inserted into an exterior surface of an object to be moved.

Embodiment: Alternative Transport Apparatus

Just as a transport apparatus previously described can be used to transport an individual assembly component from one position or location to another, so too can the transport apparatus be used as a handling apparatus to secure the positions or locations of two or more assembly components with respect to each other.

For example, it may be desired to fix the positions of mats on the ground to provide a large flat surface for individuals or machines to move across. Such mats can be made of single or multiple layers of wooden mats that are placed on a substantially flat surface, such as the ground, and arranged together to provide a pathway over that surface. Such mats can be arranged adjacent to each other, in rows; for example, a plurality of ground protection mats can be arranged together to provide a transportation surface that allows workers and heavy equipment to safely and efficiently traverse such varied terrain as fields, wetlands, and rivers, to provide surfaces that can act as access roads, work platforms, or water crossings.

Referring generally to FIG. 11, such protective mats 50, which can be configured similar to the wall panels or elongated members described above, can be arranged on the ground, in rows. Handling apparatuses 200 can be deployed to secure adjacent mats 50 together. Like the wall panels and other assembly components previously described, the protective mats 50 can include one or more bores 52 for receiving attaching members 60. Here, the pairs of attaching members 60 can connect adjacent protective mats 50 together.

In some embodiments, the attaching members 60 can be stepped dowels as previously described, and the bores 52 can be configured to accept said stepped dowels.

First and second adjacently-positioned mats 50 can be secured together. Each of the adjacently-positioned mats 50 have a side surface that faces a side surface of the other mat 50. The adjacently-positioned mats 50 can communicate with each other, or those side surfaces can face each other over a gap between them. The adjacent sides can define a longitudinal axis between the first and second adjacently-positioned mats 50, referred to as a separation element.

The first adjacent mat 50 can include a first transversely-angled bore 52 whose aperture is set distal from a top portion of the first protective mat 50, the bore 52 extending toward the second protective mat 50. The second adjacent mat 50 can include a second transversely-angled bore 52 whose aperture is set distal from a top portion of the second protective mat 50, the bore 52 extending toward the first protective mat 50.

First and second attaching members 60 can be inserted into or engage the first and second bores 52, respectively. The base portions of the attaching members 60 can protrude or extend out of the bores 52, so that the base portions angle away from each other and away from the separation element. When the attaching members 60 are engaged in the bores 52, their tip portions tip portions can be the portions of the attaching members 60 closest to each other. Conversely, the distance between the base portions the first and second attaching members 60 is greater than the distance between tip portions of the first and second attaching members 60.

The attaching members 60 can be positioned secured together with the manipulating member 65. The manipulating member 65 can connect the first and second attaching members 60 together, connecting the base portions of the attaching members 60. When made sufficiently taut or tight, the central portion of the manipulating member 65, the portion connecting the attaching members 60, will have a length that is short enough to prevent the attaching members 60 from exiting the bores 52.

For example, the manipulating member 65 can comprise a cable or chain whose length can be adjusted or secured a variety of ways, such as by clamps.

The central portion can be made short enough and taut to fix the first and second adjacent mats 50 into a rigid position. The central portion can be made loose enough to allow the first and second protective mats 50 to move to a limited degree with respect to each other (but remaining tight enough to prevent the attaching members 60 from disengaging from the bores 52). This limited degree of looseness can allow neighboring protective mats 50 to move slightly, allowing the plurality of protective mats 50 to retain a substantially flat surface, while allowing individual protective mats 50 to be repositioned to accommodate changes in the ground beneath them.

The connection that the manipulating member 65 provides between the first and second bores 52 can be adjusted as desired.

As shown in FIG. 11, a plurality of handling apparatuses 200 can be deployed to a group of secure adjacently-positioned mats 50. Each pair of adjacently-positioned protective mats 50 can include at least one bore 52 on an outer surface, positioned for pairing with another bore 52 on the outer surface of a neighboring adjacently-positioned protective mat 50, the paired bores 52 suitable for receiving an attaching member 60 such as a stepped dowel or other attachment devices previously described.

Embodiment: Method of Using the Transport Apparatus

The transport apparatus as previously described can be used to indirectly connect an assembly component to a moving or lifting device, so that the device can be used to move the assembly component.

The transport apparatus can be used to move an assembly component such as a wall panel, or elongated member, or other assembly member, having a plurality of bores, including at least one first bore set at a first transverse angle relative to the top portion of the assembly component and at least one second bore set at a second transverse angle relative to the top portion of the assembly component, the bores defining cavities for receiving an attaching member. To do so, a first attaching member is engaged to a first bore and a second attaching member is engaged to a second bore. The first and second bores define pathways that extend inward into the assembly component toward each other. When engaged, the first and second attaching members also extend inward into the assembly component and extend toward each other. The base portion of each attaching member protrudes from the bore it engages with, the base portions extending away from each other.

Optionally, adhesive can be applied to the attaching member or the bore, before or after their engagement, to facilitate a seal, which can be airtight or water-tight, between the components. When the attaching member is a dowel such as the one described in U.S. patent application Ser. No. 16/842,450, which is hereby incorporated by reference in its entirety, the dowel can be aligned in an appropriate direction with the assembly component in view of its dowel layers, and that the dowel may be pre-shrink prior to being inserted into the bore.

A manipulating member, such as a flexible cord, is used to secure the protruding portion of the first attaching member to the protruding portion of the second attaching member. The manipulating member includes a first portion that is secured to one of the attaching members and a second portion that is secured to the other attaching member. It includes a central portion extending between the attaching members and connecting the base portions of the engaged attaching members to each other.

The manipulating member can have a central portion having length suitable for securing the engaged attaching members. If not, the length of the central portion can be adjusted to be short enough to prevent the engaged attaching members from exiting their bores. The length can be adjusted before connecting the manipulating member to the attaching members or after connecting the manipulating member to one or both attaching members.

A device for lifting or moving objects can be attached or engaged to the central portion of the manipulating member, and the device can be used to apply lifting or moving force to the assembly component, to move the assembly component from a first configuration to a second configuration (or position or location). The assembly component can be transported in horizontal and vertical directions, as well as subjected to radial or rotation movements.

It is preferred that the attaching members face upward, to facilitate the vertical lifting and lowering of the assembly component by the moving device. Where the attaching members face sideward, for example, it is preferred that the moving device apply axial force to the assembly component, so that the component can be rotated so that the attaching members face upward before the assembly component is subjected to vertical, or lifting forces. Such axial movement can be applied to an upright assembly component, to move its attaching members from facing upward to facing sideward, for lowering the assembly component from an upright position to lay on its side.

In some embodiments, the assembly component surface can include a plurality of paired bores for securing a plurality of transport members; this can be desired in particularly large or heavy assembly components.

When the assembly component has been placed into a desired configuration, the transport apparatus can be disengaged from the assembly component by several methods. For example, a user can disengage the manipulating member from the engaged attaching members, and then remove the unsecured attaching members from the bores. As another example, the transport apparatus can be disengaged by adjusting the central portion of the manipulating member to a length that allows the engaged attaching members to disengaging from the bores, and disengaging the attaching members from the bores. Likewise, in embodiments where a connecting member is used, a user can disengage the manipulating member from the engaged attaching members, and then disengage the connecting member before removing the unsecured attaching members from the bores. In some embodiments, the connecting member may be used as an aid to remove the attaching members from the bores. There are a several ways to disengage the transport apparatus that are quick and efficient.

In some embodiments where a stepped dowel is used as an attaching member, where a seal has formed between the dowel and the bore, an initial disengagement can be accomplished via unsealing or opening the internal passageway present in some stepped dowels. A sealing member can be engaged to close the internal passageway and to block the movement of air through the engaged dowel and bore. The sealing member can be disengaged or otherwise manipulated to permit airflow from the base portion to the tip portion of the dowel, thus breaking the seal between the dowel and the bore. Thus, the disengagement of the dowel from bore can be initiated or facilitated.

The attaching member can be fully disengaged from the bore by hand or a tool can be used to withdraw the attaching member, such as pliers, gripping elements, or the engagement of a handling member, or the like.

Certain embodiments have described the assembly of construction components, where the top portion of the construction component contains a plurality of bores for attaching to the transport apparatus. It is to be appreciated that the top portion can include a plurality of paired bores. Thus, additional pairs of attaching members can be used to support or manipulate the assembly components, facilitating the use of multiple transport apparatuses for large or heavy assembly components. Where multiple transport apparatuses are in use, they can be connected to a single or multiple moving devices for moving the assembly component.

In a similar vein, the assembly component can contain bores placed on more than one exterior surface of wall panel. For example, bores can be arranged on top, bottom, and side surfaces, and transport apparatuses engaged to them, especially for manipulating assembly components too large or heavy to be manipulated with a single pair of attaching elements. In a similar vein, each surface can include multiple pairs of bores for engaging attaching members.

Certain embodiments of the invention have been described in terms of a transport apparatus used for moving a wall panel component of a wall panel system, which has been meant as illustrative rather than limiting. The invention can be applied to lift or move other components of other assembly systems that lack a feature for easily moving the assembly component, provided the assembly component includes a plurality of bores defining transversely-angled passageways that are suitable for receiving attaching members. Such assembly components can possess a variety of shapes and sizes, and paired bores can be arranged on almost any exterior surface of the assembly component.

Embodiment: Alternative Methods of Using the Transport Apparatus

The transport apparatus can be employed to move two or more assembly components with respect to each other.

A first transport apparatus can be attached to a top side of a first elongated member, while a second transport apparatus can be attached to a top side of a second elongated member, with the following modification. Instead of using a first manipulating member in the first transport apparatus and a second manipulating member in the second transport apparatus, a single manipulating member can be shared between the two transport apparatuses. The shared transport apparatus can be arranged to connect the paired attaching members of the first apparatus to each other, the paired attaching members of the second apparatus to each other, and connect both pairs of attaching members to each other.

For example, a chain or thread is threaded through the base portions of the first and second attaching members of the first assembly component and threaded though the base portions of the first and second attaching members of the second assembly component. The chain can be fastened so that it has a length short enough to secure the attaching members of both assembly components.

A lifting device can be used to lift both assembly components simultaneously. Alternatively, the assembly components can be rotated or flipped around a common axis, like cards on a rolodex or card index.

Where a transport apparatus includes handle portions on one or both end portions, the transport apparatus can be manipulated via its end portions, versus manipulating it via a central portion.

Another alternative embodiment involves assembly components having transport apparatuses on the top and bottom ends (or other opposed ends) of the assembly component, and having a first transport apparatus shared between the bottom of a first assembly component and the top of the second assembly component, a second transport apparatus shared between the bottom of the second assembly component and the top of a third assembly component, and so on, with a last transport apparatus shared between the bottom of a last assembly component and the top of the first assembly component. The assembly components could be joined end-to-end to make a loop or a continuous track system, similar to a tank tread.

Specific embodiments of a transport apparatus and methods of using it according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. It is understood to encompass the present invention and any and all modifications, variations, or equivalents that fall within the spirit and scope of the basic underlying principles disclosed and claimed herein.

What is claimed is:

1. A transport apparatus comprising:
   a pair of attaching members, each attaching member for engaging a transversely-angled bore on an assembly component so that a portion of the attaching member protrudes from the assembly component, wherein, when engaged in corresponding bores, each attaching member extends toward the other attaching member; and
   a manipulating member for connecting the protruding portions of the attaching members to each other, the manipulating member providing a connection so that the attaching members cannot disengage from the transversely-angled bores;
   wherein the attaching members engage the transversely-angled bores, and the manipulating member securely connects the attaching members to each other;
   wherein the manipulating member securely connects the protruding portions of the attaching members to each other, so that the attaching members cannot disengage from the transversely-angled bores; and
   wherein a portion of the secured manipulating member between the attaching members provides a location for a moving device to engage the transport apparatus, and engaged moving device can move the assembly component from a first configuration to a second configuration.

2. The transport apparatus of claim 1, wherein:
   the attaching member comprises a stepped dowel; and
   the transversely-angled bore comprises a bore configured to accept the stepped dowel.

3. The transport apparatus of claim 2, wherein the stepped dowel comprises metal.

4. The transport apparatus of claim 2, wherein the stepped dowel comprises:
   a base portion and a tip portion; and
   a passageway connecting the base and tip portions.

5. The transport apparatus of claim 4, the base and tip portions each including an aperture.

6. The transport apparatus of claim 1, the manipulating member comprises a flexible central portion.

7. The transport apparatus of claim 1, the manipulating member comprises at least one of the following: a string, a cord, a chain, a wire, a line, an elongated rod, or a tubing.

8. The transport apparatus of claim 1, comprising at least one connecting member for connecting the attaching members to each other.

9. The transport apparatus of claim 1, comprising a securing member for securely connecting the attaching member to the manipulating member.

10. The transport apparatus of claim 2, wherein the stepped dowel further comprises a strut.

11. A method for moving an assembly component having a first side including a plurality of transversely-angled bores, comprising:
    engaging first and second stepped dowels in the first and second bores, respectively, so that a portion of the dowel protrudes from the bore; and
    securing the protruding portions of the stepped dowels to each other with a flexible cord, a central portion of the flexible cord extending between the first and second dowels;
    adjusting the central portion of the flexible cord to have a length that prevents the secured stepped dowels from disengaging from the bores; and
    engaging a moving device to the central portion of the flexible cord; and
    using the engaged moving device to manipulate the assembly component from a first configuration to a second configuration.

12. The method of claim 11, comprising:
    disengaging the flexible cord from the secured stepped dowels; and
    removing the unsecured stepped dowels from the bores.

13. The method of claim 11, comprising:
    adjusting the central portion of the flexible cord to a length that allows the secured stepped dowels from disengaging from the bores;
    disengaging the secured stepped dowels from the bores.

14. The method of claim 11, wherein the stepped dowel comprises metal.

15. The method of claim 11, wherein the stepped dowel comprises:
    a base portion and a tip portion; and
    a passageway connecting the base and tip portions.

16. The method of claim 11, the base and tip portions each including an aperture.

17. The method of claim 11, the manipulating member comprises a flexible connecting element.

18. The method of claim 11, the manipulating member comprises at least one of the following: a string, a cord, a chain, a wire, a line, an elongated rod, or a tubing.

19. An apparatus for handling an assembly component having a first side including a plurality of transversely-angled bores, the transport apparatus comprising:
    first and second stepped dowels for engaging first and second bores, respectively; and
    a flexible cord for securing the stepped dowels to each other;
    wherein the stepped dowels engage the bores so that a portion of the stepped dowels protrudes from the bore, the engaged stepped dowels extending toward a longitudinal axis of the assembly component;
    wherein first and second portions of the flexible cord secure the protruding portions of the first and second stepped dowels, respectively, with a central portion therebetween, so that a length between the first and second cord portions is short enough to allow the engaged stepped dowels to disengage from the bores; and
    wherein when the transport apparatus is engaged to the assembly component, the assembly component can be moved by engaging a lifting device to the central portion of the flexible cord.

20. The transport apparatus of claim 19, wherein the stepped dowels further comprise struts.

* * * * *